United States Patent [19]

Murtha

[11] 4,397,822
[45] Aug. 9, 1983

[54] PROCESS FOR THE RECOVERY OF ALUMINA FROM FLY ASH

[76] Inventor: Marlyn J. Murtha, Ames, Iowa, granted to U.S. Department of Energy under the provisions of 42 U.S.C. 2182

[21] Appl. No.: 424,703

[22] Filed: Sep. 27, 1982

Related U.S. Application Data

[63] Continuation of Ser. No. 358,961, Mar. 17, 1982, abandoned.

[51] Int. Cl.$^3$ .............................................. C01F 7/16
[52] U.S. Cl. .................................. 423/111; 423/117; 423/119; 423/131
[58] Field of Search ................ 423/111, 117, 119, 131

[56] References Cited

U.S. PATENT DOCUMENTS

| | | | |
|---|---|---|---|
| 760,554 | 5/1904 | Onda | 423/111 |
| 1,772,360 | 8/1930 | Michell | 423/131 |
| 2,408,241 | 9/1946 | Sturbelle | 423/111 |
| 3,725,222 | 4/1973 | Russell. | |
| 4,035,169 | 7/1977 | Sebenik et al. | |
| 4,048,285 | 9/1977 | Szepesi et al. | 423/111 |
| 4,113,833 | 9/1978 | Eremin et al. | 423/111 |
| 4,130,627 | 12/1978 | Russ et al. | |
| 4,159,310 | 6/1979 | Reynolds et al. | |
| 4,252,777 | 2/1981 | McDowell et al. | 423/111 |

FOREIGN PATENT DOCUMENTS

| | | | |
|---|---|---|---|
| 50-22795 | 3/1975 | Japan | 423/117 |
| 218855 | 6/1970 | U.S.S.R. | 423/119 |

OTHER PUBLICATIONS

Dept. of Energy, "Technical Progress Report IS-4711", Sep. 1979, Ames Lab., Ames, Iowa.
Dept. of Energy, "Technical Progress Report IS-4720", Jan. 1980, Ames Lab., Ames, Iowa.
Dept. of Energy, "Technical Progress Report IS-4731", Mar. 1980, Ames Lab., Ames, Iowa.
Dept. of Energy, "Technical Progress Report IS-4744", May 1980, Ames Lab., Ames, Iowa.

*Primary Examiner*—Herbert T. Carter
*Attorney, Agent, or Firm*—James W. Weinberger; Walter L. Rees; Richard G. Besha

[57] ABSTRACT

An improvement in the lime-sinter process for recovering alumina from pulverized coal fly ash is disclosed. The addition of from 2 to 10 weight percent carbon and sulfur to the fly ash-calcium carbonate mixture increase alumina recovery at lower sintering temperatures.

9 Claims, No Drawings

PROCESS FOR THE RECOVERY OF ALUMINA FROM FLY ASH

CONTRACTUAL ORIGIN OF THE INVENTION

The United States Government has rights in this invention pursuant to Contract No. W-7405-ENG-82 between the U.S. Department of Energy and Ames Laboratory.

This is a continuation of application Ser. No. 358,961, filed Mar. 17, 1982, now abandoned.

BACKGROUND OF THE INVENTION

This invention relates to a method for the recovery of alumina from pulverized coal fly ash. More specifically, this invention relates to an improvement in the lime-sinter process for the recovery of alumina from pulverized coal fly ash.

Fly ash is being produced in increasing quantities as the result of the expanding use of pulverized coal to produce electricity. Fly ash is formed from the inorganic constituents present in the coal, and is collected from the flue gas by mechanical separation and/or electrostatic precipitation. The primary constituents of the ash are the oxides of silicon, aluminum, iron and calcium. In addition, trace elements of selenium, arsenic and other heavy metals are present.

The treatment of fly ash to recover its constituent metals has been proposed as an alternative to disposal, since, for example, a typical fly ash may contain up to fourteen percent aluminum by weight.

Several processes have been proposed for the recovery of aluminum from fly ash. One such process is disclosed in U.S. Pat. No. 4,159,310 to Reynolds et al, dated June 26, 1979. In this process, the fly ash is contacted with chlorine in an oxidizing atmosphere to selectively chlorinate and vaporize iron chloride. The residue is then chlorinated in a reducing atmosphere, vaporized and selectively condensed to separate and recover the vaporized chlorides of aluminum silicon and other metals.

Another process, described in U.S. Pat. No. 4,130,627 to Russ et al, dated Dec. 19, 1978, heats the fly ash in an aqueous alkali solution to form an aqueous blend. The blend is filtered to recover an alkaline solid which is then contacted with hydrochloric or hydrofluoric acid to form soluble salts of iron, aluminum and other metals, which can be recovered and separated by selective percipitation.

In the lime-soda sinter process, a mixture of fly ash, calcium carbonate and sodium carbonate are sintered to form a clinker containing soluble sodium and calcium aluminates. The clinker is reduced to powder and the soluble compounds dissolved in a dilute solution of sodium carbonate.

While these processes are satisfactory for producing an aluminum compound suitable for commercial sale, the processes are complex and/or utilize reactants which are expensive, thus substantially increasing the cost of the resulting product.

In a less costly process, about one part fly ash and two parts calcium carbonate are sintered at 1400° C. to form a clinker containing a calcium aluminate compound, which is then dissolved in a dilute sodium carbonate solution. Although the reactants are inexpensive, the process recovers only 50 to 60% of the available aluminum and requires high sinter temperatures which result in high energy and equipment costs.

SUMMARY OF THE INVENTION

It has been found that the addition of a small amount of sulfur and carbon to the lime-fly ash sinter mixture before sintering, lowers the optimum sinter temperature, resulting in an energy and equipment saving, and increases the amount of alumina recovered from the fly ash to almost 90%. This is equivalent to the alumina recovery attainable with the more expensive lime-soda sinter process.

According to the invention for recovering alumina from fly ash, about 2 to 10 weight percent sulfur and carbon is added to a mixture of about 1 part fly ash and 2 parts calcium carbonate to form a sinter mixture, the sulfur to carbon ratio varying from 0.5 to 1.5, the sinter mixture is then heated at 1100° to 1300° C. for a period of time sufficient for the sulfur to react with the alumina and calcium, forming a clinker containing a calcium sulfoaluminate compound. The clinker is reduced to a powder which is contacted with a dilute sodium carbonate solution to dissolve the calcium sulfoaluminate compound, thereby recovering the alumina.

It is therefore one object of the invention to provide an economical process for recovering alumina from fly ash.

It is another object of the invention to provide an improvement in the lime-sinter method for recovering alumina from fly ash.

Finally, it is the object of the invention to provide an improvement in the lime-sinter method of recovering alumina from fly ash by reducing the sintering temperature and increasing the percentage of alumina recovery.

DETAILED DESCRIPTION OF THE PREFERRED EMBODIMENT

These and other objects of the invention for recovering alumina from fly ash containing alumina and other metals may be met by forming a mixture of about one part fly ash and two parts calcium carbonate, adding about 1 to 2 weight percent sulfur and about 1 to 2 weight percent carbon to the mixture to form a sinter mixture, heating the sinter mixture to about 1175° to 1225° C. for 15 minutes to two hours to react the sulfur with the calcium and alumina and sinter the mixture, forming a clinker containing a calcium sulfoaluminate compound, reducing the clinker to a coarse powder, and contacting the powder with an aqueous solution containing about 3 weight percent sodium carbonate to dissolve the calcium sulfoaluminate compound thereby recovering the alumina from the fly ash.

Sufficient sulfur must be present in the sinter mixture to react with the calcium and alumina in the fly ash to form the calcium sulfoaluminate compound. Additions of sulfur up to about 10 weight percent have been shown to achieve about a 90% alumina recovery. However, the addition of a small amount of carbon, i.e. 1 to 4 weight percent, permits reduction of the amount of sulfur necessary to achieve the same alumina recovery. The total amount of carbon and sulfur added to the fly ash-sinter mixture may vary from about 2 to 10 weight percent, preferably 2 to 4 weight percent with a sulfur to carbon ratio of 0.5 to 1.5, preferably 1. The carbon and sulfur may suitably be added to the mixture as a coal refuse containing these elements within the desired ratio.

The ratio of fly ash to calcium carbonate is generally about one to two, but may vary somewhat according to the fly ash composition in order to achieve optimum results.

The mixture must be heated to a temperature sufficient to react the sulfur with the calcium and alumina to form of the calcium sulfoaluminate compound and sinter the mixture to form a clinker. Temperatures may vary from about 1100° to 1300° C., preferably from 1175° to 1225° C. most preferably about 1200° C. Temperatures which are too high, i.e. over 1300° C., have been found to reduce alumina recovery, apparently by forming insoluble compounds.

Sintering times need only be sufficient to sinter the mixture and form the calcium sulfoaluminate compound, and may vary according to the sintering temperature and the massiveness of the mixture. Generally times from 18 minutes to two hours were adequate at the preferred sinter temperature of 1200° C.

The clinker is preferably ground or otherwise reduced to a coarse powder to facilitate dissolution of the soluble aluminate compound.

The solvent solution may vary in strength from about 2 to 4, preferably 3 weight percent, sodium carbonate in water. The calcium sulfoaluminate compound dissolves to form sodium aluminate while the sulfur and calcium precipatate and are recoverable for reuse. The alumina may be recovered from the solution by any of the known methods such as by pH change or by seeding and cooling. The solid to liquid ratio may vary from 0.5 to 0.05, preferably about 0.1.

The method of the invention is suitable for the recovery of alumina from any fly ash containing alumina. While not required, the fly ash is preferably subjected to a magnetic separation in order to remove the magnetic portion of the fly ash containing most of the iron and other heavy metals from the non-magnetic portion containing the alumina and silica. This helps reduce the total amount of reactant necessary to recover the alumina and also reduces the quantity of waste which must be disposed of.

The following examples are given to illustrate the invention and are not to be taken as limiting the scope of the invention which is defined by the appended claims.

EXAMPLE I

In order to determine the effect of various additives on alumina recovery from fly ash, a number of different sinter mixtures were prepared and sintered under two different temperatures. Each mixture consisted of 1.7 parts $CaCO_3$ to one part non-magnetic fly ash by weight with additives added. The mixtures were sintered for one hour at either 1200° or 1380° C. The resulting clinker was then ground to a fine powder. The soluble compounds were extracted with 3 weight percent aqueous $Na_2CO_3$ solution at 65° C. for ten minutes. The solid/liquid ratio was 0.1. The results are given in Table I below:

TABLE I

| Additive wt. percent | | Equivalent wt. percent | | | Percent Soluble Alumina | |
|---|---|---|---|---|---|---|
| | | Fe | C | S | 1200° C. | 1380° C. |
| Coal Refuse, | 0 | — | — | — | 38.5 | 55.3 |
| | 2.5 | 0.77 | 0.76 | 0.81 | 73.5 | 69.2 |
| | 3.75 | 1.16 | 1.13 | 1.21 | 89.0 | 82.6 |
| | 5.0 | 1.55 | 1.51 | 1.62 | 75.0 | 54.2 |
| | | | | | 69.9 | |
| $FeS_2$ | 7.5 | 2.32 | 2.27 | 2.43 | 35.1 | 45.4 |

TABLE I-continued

| Additive wt. percent | | Equivalent wt. percent | | | Percent Soluble Alumina | |
|---|---|---|---|---|---|---|
| | | Fe | C | S | 1200° C. | 1380° C. |
| | 2.0 | 0.93 | — | 1.07 | 25.3 | 52.8 |
| | 2.5 | 1.16 | — | 1.33 | 62.6 | 55.1 |
| | 3.0 | 1.40 | — | 1.60 | 44.1 | 55.1 |
| $FeS_2$, C | 3.0 | 1.40 | 1.36 | 1.60 | 68.2 | 69.9 |
| S, C | | — | 1.36 | 1.6 | 86.4 | 61.7 |
| | | | | | 77.2 | |
| S | | — | — | 1 | 58.5 | |
| | | — | — | 2 | 72.9 | |
| | | — | — | 4 | 75.7 | |
| | | — | — | 6 | 76.8 | |
| | | — | — | 8 | 69.7 | |
| | | — | — | 10 | 85.2 | |
| S, C | | — | 1 | 1 | 49.2 | |
| | | — | 2 | 2 | 64.1 | |
| | | — | 4 | 4 | 75.7 | |
| | | — | 2 | 1 | 54.0 | |
| | | — | 1 | 2 | 53.6 | |
| | | — | 1.5 | 1.5 | 59.8 | |
| | | — | 1.4 | 1.6 | 67.0 | |
| | | — | 1.2 | 1.8 | 57.1 | |
| | | — | 1 | — | 32.4 | |
| | | — | 2 | — | 33.0 | |
| | | — | 3 | — | 36.0 | |

The results clearly indicate the addition of a combination of S and C, either elementally or as coal refuse, produce a high recovery of alumina from fly ash, and that these results are attained at lower sintering temperatures resulting in a net energy savings.

As is seen from the preceeding discussion and Example, an effective and economical process has been provided for the recovery of alumina from fly ash.

The embodiments of this invention in which an exclusive property or privilege is claimed are defined as follows:

1. In the process for recovering alumina from fly ash containing oxides of alumina, silica and other metals wherein the fly ash is mixed with calcium carbonate to form a mixture, the mixture is heated from 1350° to 1400° C. for a period of time sufficient to form a clinker containing a soluble calcium aluminate compound, the clinker is reduced to a powder, and the powder is contacted with dilute sodium carbonate solution to dissolve the soluble calcium aluminate compound, thereby recovering the alumina, the improvement comprising, adding from about 2 to 10 weight percent carbon and elemental sulfur to the fly ash-calcium carbonate mixture before sintering, the sulfur to carbon ratio being from 0.5 to 1.5, heating the mixture to 1100° to 1300° C. for a period of time sufficient for the sulfur to react with the alumina and calcium to form a clinker containing a calcium sulfoaluminate compound, whereby upon reducing the clinker to powder and contacting the powder with dilute sodium carbonate solution, the amount of alumina recovered from the fly ash is increased.

2. The process of claim 1 wherein the sulfur and carbon added to the mixture is from 2 to 4 weight percent.

3. The process of claim 2 wherein the ratio of sulfur to carbon is about 1.0.

4. The process of claim 3 wherein the sinter temperature is from 1175° to 1225° C., and the sinter time is up to 2 hours.

5. A process for recovering alumina from fly ash containing oxides of alumina, silica and other metals comprising:

mixing the fly ash with calcium carbonate to form a mixture, adding from about 2 to 10 weight percent carbon and elemental sulfur to the mixture to form a sinter mixture the carbon and sulfur being present in a ratio of 0.5 to 1.5, heating the mixture at 1100° to 1300° C. for a period of time sufficient for the sulfur to react with the alumina and calcium to form a clinker containing a calcium sulfoaluminate compound, reducing the clinker to powder, contacting the powder with a dilute aqueous sodium carbonate solution to dissolve the calcium sulfoaluminate compound, and recovering the aluminate compound from the solution thereby recovering the alumina from the fly ash.

6. The process of claim 5 wherein the ratio of fly ash to calcium carbonate is about 1 to 2, and the sulfur and carbon added to the mixture is from 2 to 4 weight percent.

7. The process of claim 6 wherein the carbon to sulfur ratio is about 1.0.

8. The process of claim 7 wherein the mixture is heated at 1175° to 1225° C. for up to 2 hours.

9. The process of claim 7 wherein the dilute solution is about 3.0 weight percent sodium carbonate, and the solid to liquid ratio is from 0.5 to 0.05.

* * * * *